US 8,275,984 B2
Sep. 25, 2012

(12) United States Patent
Loveless

(10) Patent No.: US 8,275,984 B2
(45) Date of Patent: Sep. 25, 2012

(54) TLS KEY AND CGI SESSION ID PAIRING

(75) Inventor: Peter Loveless, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 12/335,329

(22) Filed: Dec. 15, 2008

(65) Prior Publication Data

US 2010/0153702 A1 Jun. 17, 2010

(51) Int. Cl.
H04L 29/06 (2006.01)
(52) U.S. Cl. ............ 713/151; 713/154; 726/22; 726/23; 705/75
(58) Field of Classification Search .................. 713/151, 713/154; 705/75; 726/22, 23
See application file for complete search history.

(56) References Cited

U.S. PATENT DOCUMENTS

| | | | |
|---|---|---|---|
| 7,072,886 B2 | 7/2006 | Salmenkaita et al. | |
| 7,178,166 B1 * | 2/2007 | Taylor et al. | 726/25 |
| 7,343,626 B1 | 3/2008 | Gallagher | |
| 7,469,341 B2 * | 12/2008 | Edgett et al. | 713/176 |
| 2003/0159029 A1 | 8/2003 | Brown et al. | |
| 2004/0243349 A1 | 12/2004 | Greifeneder et al. | |
| 2004/0260754 A1 | 12/2004 | Olson et al. | |
| 2005/0015601 A1 * | 1/2005 | Tabi | 713/182 |
| 2007/0143829 A1 | 6/2007 | Hinton et al. | |
| 2007/0282951 A1 * | 12/2007 | Selimis et al. | 709/205 |

OTHER PUBLICATIONS

Curphey et al., "A Guide to Building Secure Web Applications and Web Services", retrieved on Oct. 15, 2008 at <<http://www.mirrorservice.org/sites/download.sourceforge.net/pub/sourceforge/o/ow/owasp/guide_v2a2.pdf>>, The Open Web Application Security Project (OWASP), 2002, pp. 1-149.
Karlof et al., "Dynamic Pharming Attacks and Locked Same-Origin Policies for Web Browsers", retrieved on Oct. 15, 2008 at <<http://umeshshankar.com/research/locked-sop/locked-sop-ccs07.pdf>>, ACM (978-1-59593-703-Feb. 7, 2000, CCS07), 2007, pp. 1-14.
Karlof et al., "Locked Cookies: Web Authentication Security Against Phishing, Pharming, and Active Attacks", retrieved on Oct. 15, 2008 at <<http://www.eecs.berkeley.edu/Pubs/TechRpts/2007/EECS-2007-25.pdf>>, Technical report UCB/EECS-2007-25, 2007, pp. 1-32.
"Hiawatha", retrieved on Oct. 17, 2008 at http://sourceforge.net/projects/hiawatha/>>, SourceForge, Inc., 1999-2008, 1 pg.

* cited by examiner

Primary Examiner — Nathan Flynn
Assistant Examiner — Sarah Su
(74) Attorney, Agent, or Firm — Lee & Hayes, PLLC

(57) ABSTRACT

The prevention of impersonation attacks based on hijacked common gateway interface (CGI) session IDs is disclosed. In accordance with one embodiment, a secured communication channel is formed between a server and a client using an initial transport layer security (TLS) key. Additionally, an authenticated CGI session is formed over the secured communication channel based on an initial CGI session identifier (ID). Further, the initial CGI session ID and the initial TLS key are combined into a pair. Next, incoming data that includes an incoming CGI session ID is received via a secured communication channel. An incoming TLS key of the secured communication channel that carries the incoming CGI session ID is then retrieved. Based on the retrieved incoming TLS key, the incoming data is permitted to execute on the server when the incoming TLS key matches the initial TLS key of the pair.

20 Claims, 5 Drawing Sheets

US 8,275,984 B2

TLS KEY AND CGI SESSION ID PAIRING

BACKGROUND

A threat to the security of many web applications today is imposed by a software exploitation technique commonly known as "cross-site scripting." Generally speaking, cross-site scripting is a process through which a malevolent individual may compromise the security of a web application by posting malicious web script code onto a web site via the web application's own user interface. The intent of a cross-site scripting attempt is to upload the malicious web script onto the web site in the hope that this malicious payload will be delivered to the web browsers of unsuspecting users that happen to browse to locations where the malicious payload has been placed.

In the event that an attacker has successfully executed a cross-site scripting attack to deliver a malicious payload to an unsuspecting user's web browser, the attacker may use the malicious payload to retrieve and hijack the user's common gateway interface (CGI) session identifier (ID). Generally speaking, a CGI session ID is an identifier that enables the user to engage in a secured web session with a web site and/or web application. When the attacker has hijacked the user's CGI session ID, the attacker may connect to the web site and/or web application and submit the compromised CGI session ID in an attempt to impersonate the unsuspecting user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for preventing the hijacking of common gateway interface (CGI) session IDs for impersonation attacks. In various embodiments, the prevention of impersonation attacks may include the use of a transport layer security (TLS) session key and a CGI session identifier (ID) pair. In at least one embodiment, a secured communication channel is formed between a server and a client using an initial transport layer security (TLS) key. Additionally, an authenticated common gateway interface (CGI) session is formed over the secured communication channel based on an initial CGI session identifier (ID). Further, the initial CGI session ID and the initial TLS key are combined into a pair. Next, incoming data that includes an incoming CGI session ID is received via a secured communication channel. An incoming TLS key of the secured communication channel that carries the incoming CGI session ID is then retrieved. Based on the retrieved incoming TLS key, the incoming data is permitted to execute on the server when the incoming TLS key matches the initial TLS key of the pair. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to embodiments for preventing impersonation attacks that are based on the use of cross-site scripting. Specifically, the embodiments described herein are directed to using a pairing of a transport layer security (TLS) session key and a common gateway interface (CGI) session ID to prevent impersonation attacks based on hijacked CGI session IDs, where the hijacked CGI session IDS may be obtained by malicious attackers through cross-site scripting attacks, or other forms of attacks. In various embodiments, the combination of a TLS key and CGI session ID may be used as an authentication mechanism during access to a web server. The use of the TLS key and CGI session ID combination pair as an authentication mechanism may deprive a malicious attacker the ability to impersonate a legitimate user even if the attacker is able to hijack the legitimate user's CGI session ID. In this way, the legitimate user's data, as stored on the web server, may be further protected from unauthorized access. Various examples of using TLS key and CGI session ID pairing to prevent impersonation attacks are described below with reference to FIGS. 1-4.

Exemplary Schemes

Figure 1A:
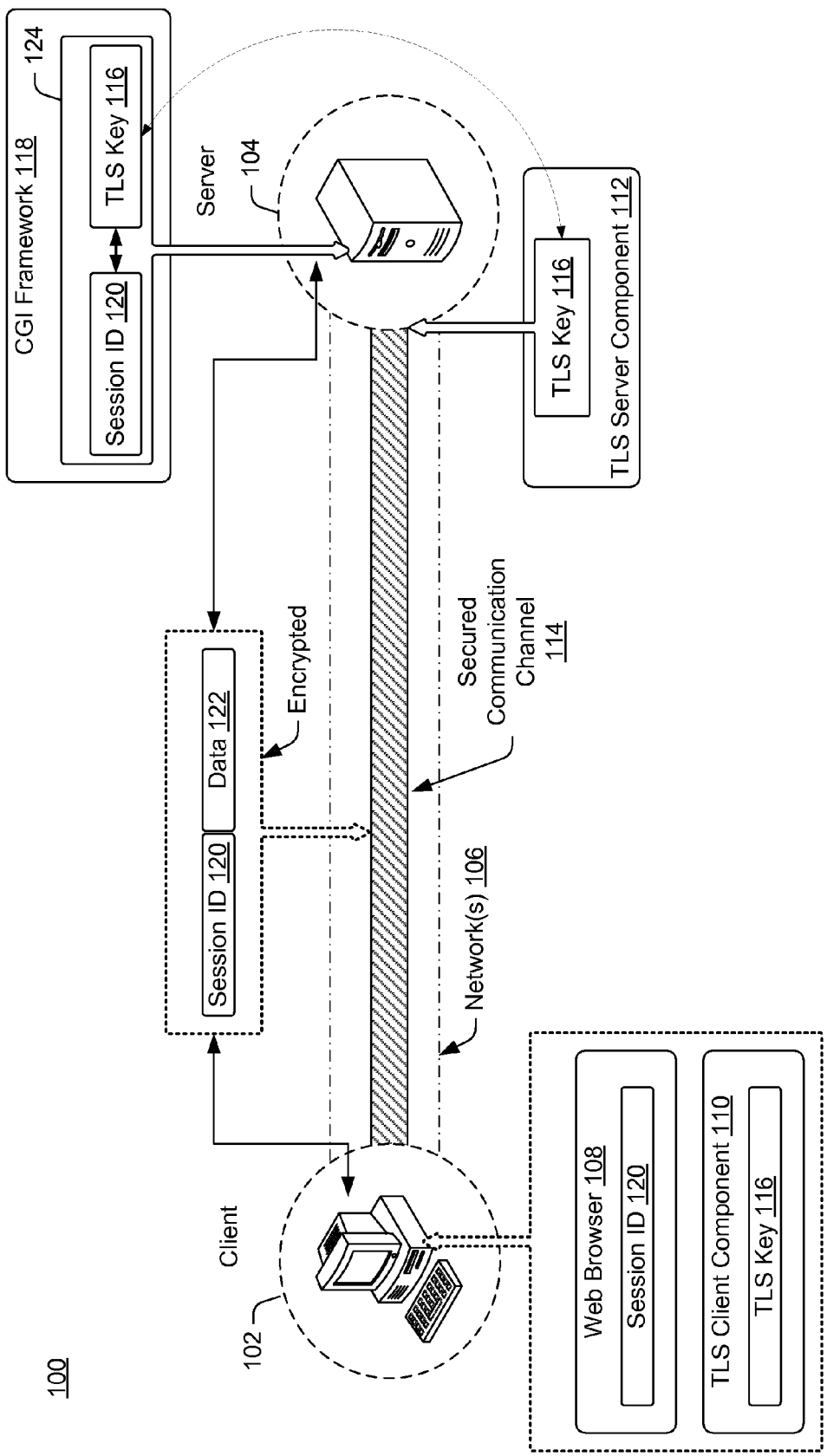
FIGS. 1a and 1b show block diagrams illustrating exemplary operations of a transport layer security (TLS) session key and common gateway interface (CGI) ID pair as a network user authentication mechanism, in accordance with various embodiments.
Figure 1B:
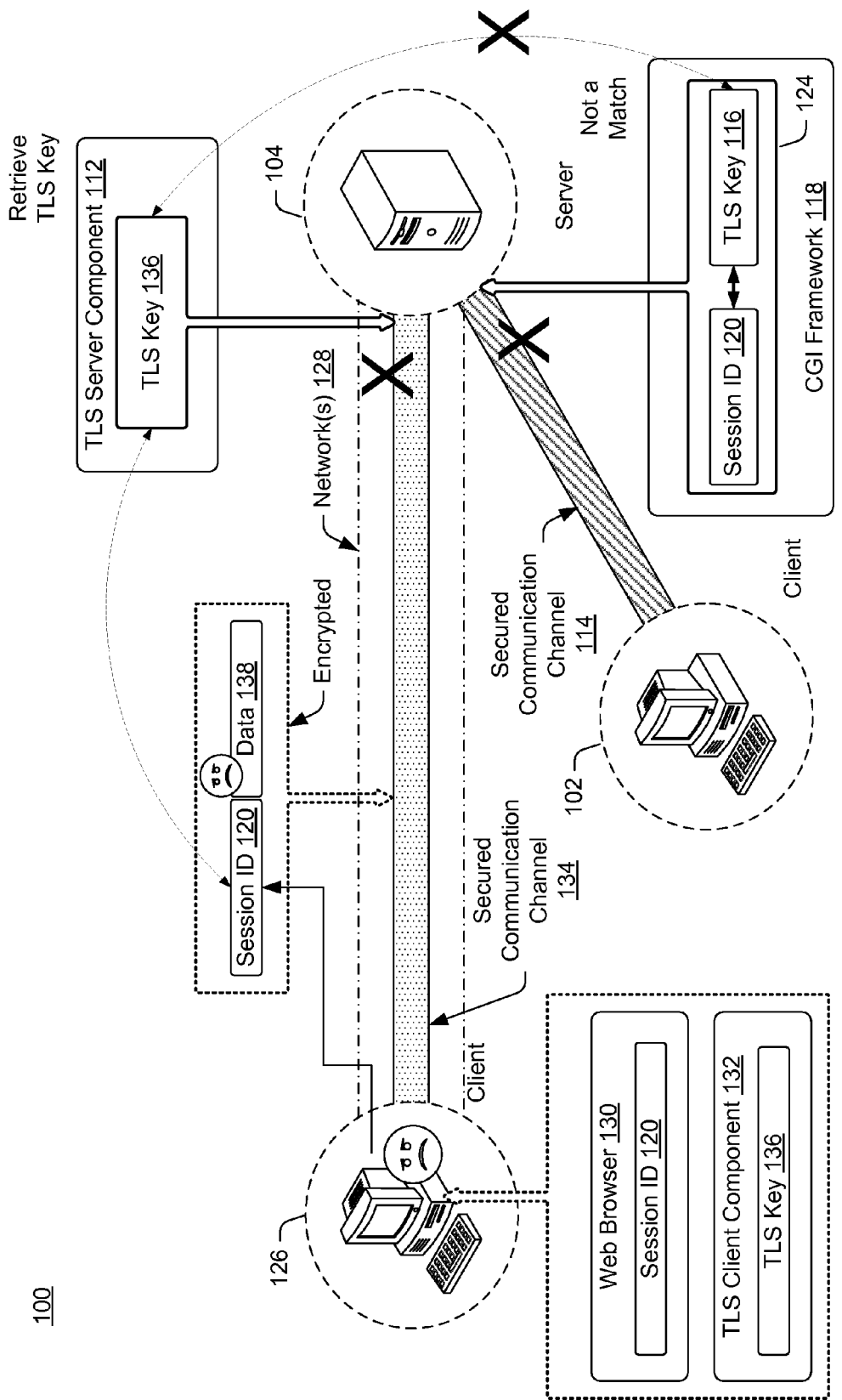

FIGS. 1a and 1b show block diagrams illustrating exemplary operations of a transport layer security (TLS) session key and common gateway interface (CGI) ID pair as a network user authentication mechanism, in accordance with various embodiments of TLK key and CGI session ID pairing.

As shown in FIG. 1a, the network environment 100 may include a client 102 and a web server 104. The client 102 may be any computer that has network access capabilities, e.g., a desktop computer, a laptop computer, a tablet computer, etc. The web server 104 may be any computer that is capable of accepting data requests from the client 102 and return data, such as web pages and other content to the client 102. The client 102 and the web server 104 may communicate over one or more communication networks 106.

The client 102 may include a web browser 108 and a Transport Layer Security (TLS) client component 110. The web browser 108 may be any software application that enables a user to display text, images, videos, and other information located at a website on the World Wide Web (WWW) or local area network. As further described below, the TLS client component 110 may work in conjunction with a counterpart TLS server component 112 on the web server 104 to implement encrypted data exchange secured communication channel 114. The one or more communication networks 106 may include at least one of a wide-area network (WAN) component, a local area network (LAN) component, and the like.

A secured communication channel 114 may be established between the client 102 and the web server 104 via the communication network 106. The secured communication channel 114 may provide a web user at the client 102 with a tamper-resistant channel for access to one or more web sites and/or web applications stored on the web server 104.

In various embodiments, the secured communication channel 114 may be established using Secure Socket Layer (SSL), also known as Transport Layer Security (TLS). It will be appreciated that TLS is an open standard that is used to provide privacy and authentication services to software communication that take place across unsecured networks. TLS may provide server authentication through the use of a certificate (e.g., X.509 certificate). The use of certificates for web server authentication may enable web users that wish to interact with web sites to verify that such web sites are not substituted with imposter sites.

TLS also provides privacy to communications between the client 102 and the web server 104 by enabling the client 102 and the web server 104 to share a TLS session encryption key, which is shown as TLS key 116 in FIG. 1a.

It will be appreciated that the establishment of a secure TLS communication channel 114 and the sharing of the TLS key 116 may include the following steps. In various embodiments, the client 102 initiated steps may be performed by the TLS client component 110, while the web server 104 initiated steps may be performed by the TLS server component 112.

First, the client 102 may send a "Client hello" message, that is, a contact initiation message, to the web server 104, along with a random value and supported cipher suites. Second, the web server 104 may respond by sending a "Server hello" message, that is, a contact reply message, to the client 102, along with the web server 104's random value. Third, the client 102 and the web server 104 may exchange certificates (e.g., X.509 certificates), so that client 102 may verify the identity of the web server 104, and vice versa. Next, the client 102 may create a random Pre-Master Secret and encrypts it with the public key from the web server 104's certificate. The client 102 may then send the encrypted Pre-Master Secret to the server. Subsequently, when the web server 104 receives the Pre-Master Secret, the web server 104 and the client 102 may each generate and store a Master Secret and identical duplicate copies of the TLS key 116 based on the Pre-Master Secret. In various embodiments, the client 102 may store the TLS key 116 in a cache of the TLS client component 110. Likewise, the web server 104 may store the TLS key 116 in a cache of the TLS server component 112.

When the client 102 and the TLS client component 110 have stored the TLS key 116, the client 102 and the web server 104 may switch to exchanging data that are encrypted by the TLS key 116 over the secured communication channel 114. In other words, each of the client 102 and the web server 104 may use the TLS key 116 to encrypt and decrypt data transmitted between the client 102 and the web server 104.

Accordingly, once the client 102 and the web server 104 have established the secured communication channel 114 and implemented TLS key 116, the web user at the client 102 may use the web browser 108 to access web sites and/or web applications stored on the web server 104.

In some instances, the web server 104 may include a common gateway interface (CGI) framework 118 that enables the user to access one or more web sites and/or web applications on the web server 104 via an authenticated session. An authenticated session generally requires a web user to correctly enter some form of user authentication (e.g., user name and/or password). In exchange, the authentication session may make use of a randomly generated CGI session ID 120 that is issued to the client 102 by the CGI framework 118. Subsequently, any data exchanged between the client 102 and the web server 104, such as data 122, may be tagged with the CGI session ID 120. Thus, the CGI session ID 120 may help to ensure that the client 102 is receiving legitimate data from the web server 104, and vice versa. Moreover, since the data is being exchanged over the secured communication channel 114, the data is also encrypted, such as by the TLS key 116.

For example, the web user at the client 102 may wish to access his/her financial information at a financial institution web site that requires user authentication (e.g., user name and password). Once the web user has inputted the correct user authentication, the CGI framework 118 may grant the client 102 a CGI session ID, such as the CGI Session ID 120. The CGI session ID helps to ensure that any data received at the financial institution web site is in fact from the web user, and that any data the web user receives is in fact data that is appropriate for that user, as from the financial institution web site.

It will be appreciated that since secure communication channel 112 and the CGI authenticated sessions are implemented independently of each other, the protection afforded by one of these mechanisms is not dependent on the integrity of the other mechanism. This fact is the basis for the formation of a CGI session ID and TLS Key pair to thwart impersonation attacks based on a hijacked CGI session ID.

As shown in FIG. 1a, the CGI session ID 120 and the TLS key 116 may be paired as pairing 124. In other words, the CGI Framework 118 may be provided access to the TLS key 116 so that the pairing 124 may be formed. The pairing 124 may be stored on the web server 104.

As described with respect to FIG. 1b, the pairing 124 may prevent a malicious attacker from impersonating the web user by infiltrating an authenticated session between the client 102 and the web server 104 using a hijacked CGI session ID.

FIG. 1b illustrates the use of a CGI session ID and a TLS key pair to prevent a malicious attacker from impersonating a web user using a hijacked CGI session ID. The client 102, the web server 104, and the secured communication channel 114, as shown in the network environment 100 of FIG. 1a, are illustrated in FIG. 1b. Moreover, FIG. 1b also illustrates the pairing 124 of the CGI session ID 120 and TLS key 116 that may be stored in the web server 104, as previously illustrated in FIG. 1a.

As further shown in FIG. 1b, the network environment 100 may also include a client 126. The client 126 may be used by a malicious attacker. The client 126 and the web server 104 may communicate over one or more communication networks 128. The client 126 may include a web browser 130 and a Transport Layer Security (TLS) client component 132. The TLS client component 132 may work in conjunction with a counterpart TLS component on the web server 104 to implement encrypted data exchange using secured communication channel 134. The one or more communication networks 128 may include at least one of a wide-area network (WAN) component, a local area network (LAN) component, and the like.

Moreover, in some embodiments, the client 126 may share at least one of a WAN or a LAN component with the one or more networks 106 (FIG. 1a).

The malicious attacker may have obtained the CGI session ID 120 of the web user through a cross-site scripting attack. Accordingly, the malicious attacker may initiate an impersonation attack by forming a secured communication channel 134 with the web server 104. In various embodiments, the secured communication channel 134 may be also established using TLS. Thus, the formation of the secured communication channel 134 may result in the generation of duplicate copies of the TLS key 136, with one copy being stored in the TLS client component 132, and the other copy of the TLS key 136 stored in the TLS server component 112 of the web server 104.

Following the establishment of the secured communication channel 134, the malicious attacker may attempt to impersonate the web user and transmit malicious data 138 to the web server 104 by associating the data with the hijacked CGI session ID 120. In various embodiments, the malicious attacker may send the malicious data 138 and the hijacked CGI session ID 120 using the web browser 130. Moreover, the malicious data 138 may be intended to manipulate the web user's data stored on the web server 104, return the web user's data to the client 126, or otherwise perform activities that are harmful to the integrity of the web user's data.

However, upon receiving the malicious data 138 and the falsely associated CGI Session ID 120, the CGI framework 118 of the web server 104 may retrieve the TLS key 136 from the TLS server component 112. The TLS key 136 may be retrieved by the CGI framework 118 because the malicious data 138 was sent to the web server 104 via the corresponding secured communication channel 134. Subsequently, the web server 104 may look up the TLS key that is supposed to be paired with the CGI session ID 120. In various embodiments, the web server 102 may determine that the TLS key that is supposed to be paired with the CGI session ID 120 is the TLS key 116 of the pairing 124.

Since the TLS key 116 is not the same key as the TLS key 136, the web server 104 may determine that the malicious data 138 did not come from the legitimate web user at client 102. Accordingly, in some embodiments, the web server 104 may terminate one or more communication channels and sessions associated with the compromised CGI session ID 120. In some embodiments, the web server 104 may terminate the session being carried over the secured communication channel 134, as well as the secured communication channel 112. The web server 104 may also terminate the session being carried over the secured communication channel 114, as well as the secured communication channel 114 along with terminating secured communication channel 134.

However, in other embodiments, the web server 104 may only terminate the secured communication channel 134 (the carrier channel of the compromised CGI session ID 120), while leaving the secured communication channel 114 and the session carried by the channel intact.

Exemplary Components

Figure 2:
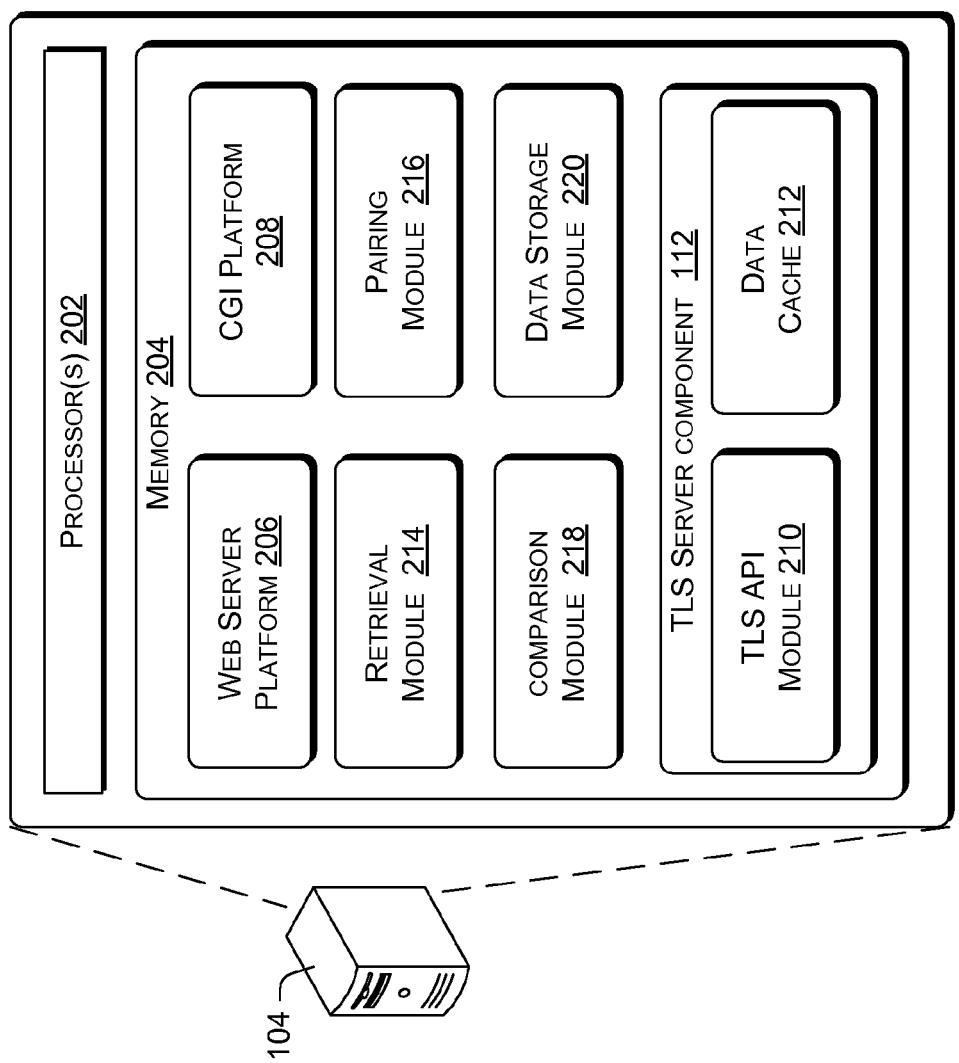
FIG. 2 shows a block diagram illustrating selected components of an exemplary web server that is configured to use the transport layer security (TLS) session and common gateway interface (CGI) ID pair as a user authentication mechanism, in accordance with various embodiments of TLS key and CGI session ID pairing.

FIG. 2 illustrates selected components of an exemplary web server, such as the web server 104 described with regard to FIGS. 1*a* and 1*b*.

Figure 4:
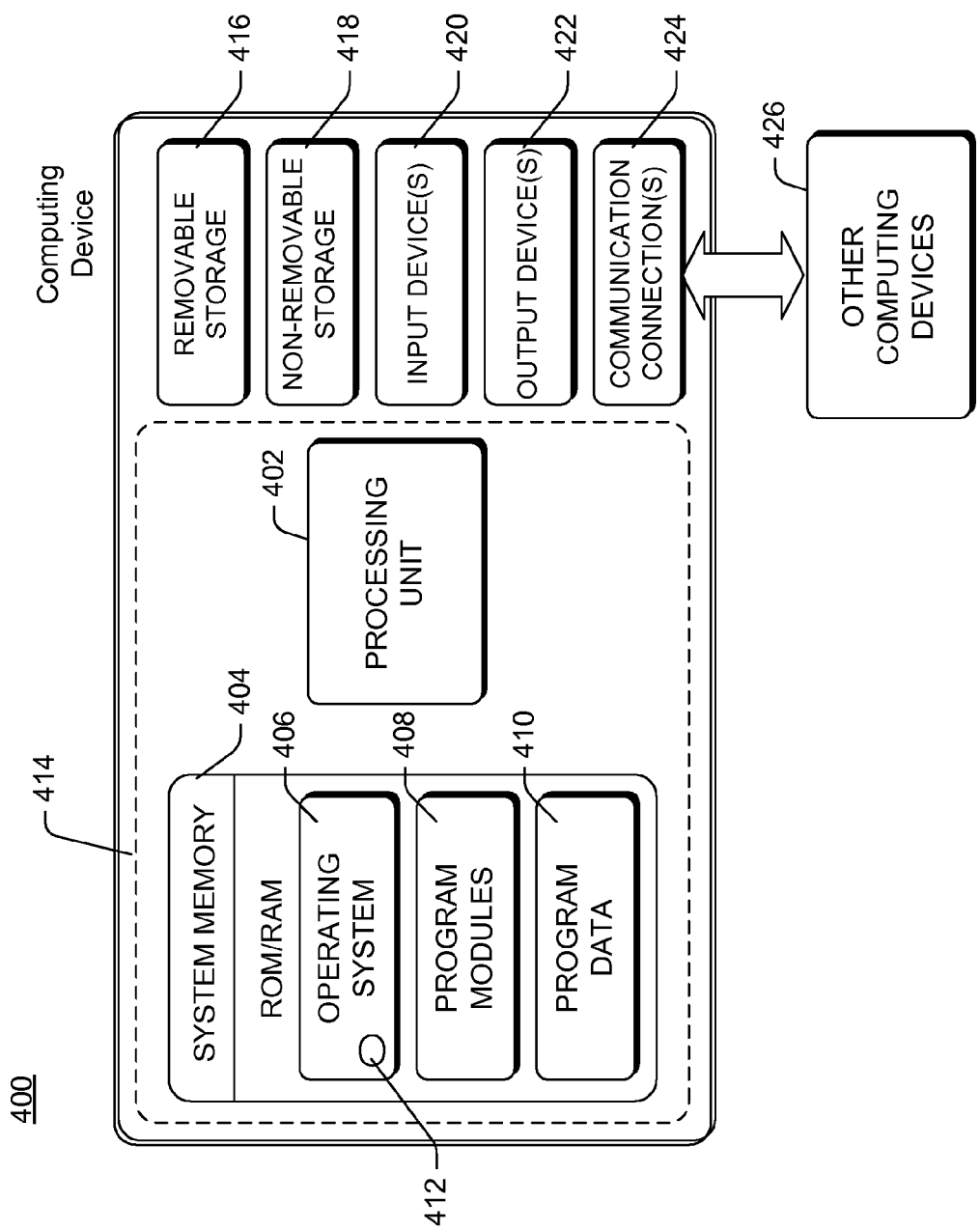
FIG. 4 shows a block diagram illustrating a representative computing device. The representative device may be a part of a network environment, in accordance with various embodiments of TLS key and CGI session ID pairing.

The web server 104 may include computer-program instructions being executed by a computing device, such as those in the computing device described in FIG. 4. The web server 104 may include one or more processors 202 and memory 204. The memory 204 may include volatile and nonvolatile memory, removable and non-removable media implemented in any method or technology for storage of information, such as computer-readable instructions, data structures, program modules or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The web server 104 may store program instructions in the memory 204. The program instructions, or modules, may include routines, programs, objects, components, and data structures that perform particular tasks or implement particular abstract data types. The modules may be implemented as software or computer-executable instructions that are executed by one or more processors 202. As shown in FIG. 2, the web server 104 may include a web server platform 206, a CGI Platform 208, the transport layer security (TLS) server component 112 that further includes a TLS application program interface (API) 210, a data cache 212, a retrieval module 214, a pairing module 216, a comparison module 218, and a data storage module 220. However, it will be appreciated that the web server may also include other modules that perform other functions.

The web server platform 206 may include web service components that provide web pages and web applications to clients, such as client 102. In various embodiments, the web server platform 206 may include the Internet Information Services (IIS), produced by the Microsoft Corporation of Redmond, Wash. In other embodiments, the web server platform 206 may include Apache HTTP server components, and the like.

The CGI Platform 208 may include a web application framework that supports dynamic websites and web applications. For example, but not as a limitation, the CGI platform 208 may include the ASP.NET framework developed by the Microsoft Corporation of Redmond, Wash. Web applications are applications that are accessed via web browsers over networks, such as the one or more networks 106 (e.g., web-based mail, multi-player online games, etc.). The CGI Platform 208 may perform services such as web caching, or the caching of certain web pages for later retrieval to reduce bandwidth usage. Moreover, the CGI Platform 208 may also include authentication and authorization frameworks. These frameworks may enable the web server 104 to identify users, as well as to restrict access to data and applications stored on the web server 104 based on user identity. In various embodiments, the CGI Platform 208 may enable one or more web users to communicate with the web server 104 through secured sessions by issuing CGI sessions IDs, such as the CGI session ID 120 (FIG. 1*a*).

The TLS server component 112 may be configured to established secured communication channels with various clients, such as the secured communication channel 114 with the client 102, as previously described in relation to FIG. 1*a*.

In various embodiments, the TLS server component 112 may include a TLS application program interface (API) module 210. The TLS API module 210 may be configured to enable the CGI Platform 208 to extract TLS session encryption keys of secured communication channels from the TLS server component 112 based on inputted CGI session IDs. In various embodiments, the CGI Platform 208 may activate the retrieval module 214 to send a TLS key retrieval request to the TLS API module 210. The retrieval request may include a CGI session ID. Upon receiving the retrieval request that includes the CGI session ID, the TLS API module 210 may identity the TLS key stored in the TLS server component 112 that corresponds to the CGI session ID. In other words, the TLS API module 210 may identify the secured communication channel that is carrying the CGI authenticated session that is implemented using CGI session IDs. The TLS API module 210 may then extract the TLS key that corresponds to the identified secured communication channel from a data storage in the TLS server component 112. This data cache is depicted as data cache 212 in FIG. 2. The retrieval module 214 may then return the TLS key to the CGI Platform 208.

The retrieval module 214 may be configured to enable the CGI Platform 208 to interface with the TLS API module 210 for the purpose of providing TLS keys to the CGI Platform 208. In various embodiments, the CGI Platform 208 may use the retrieval module 214 to provide CGI session IDs to the TLS API module 210.

In exchange, the retrieval module may pass the CGI Session IDs to the TLS API module 210 and return corresponding TLS keys to the CGI Platform 208. In some embodiments, the retrieval module 214 may be an integral part of the CGI Platform 208.

The pairing module 216 may be configured to pair each retrieved TLS key, as obtained via the retrieval module 214, with a corresponding CGI session ID stored in the CGI Platform 208. For example, the pairing module 216 may associate the CGI session ID 120 with the TLS key 116 (FIG. 1a) to form pairing 124. The pairing module 216 may be further configured to store the pairings of the CGI session IDs and TLS keys in the data storage module 220. Moreover, the pairing module 216 may be configured to form a pairing when a CGI authenticated session is initially established to implement a particular CGI session ID. In some embodiments, the retrieval module 214 may be an integral part of the CGI Platform 208.

The comparison module 218 may be implemented to use the TLS API module 210 to retrieve a TLS key that is associated with the CGI session ID of every piece of data received at the web server 104. In various embodiments, the comparison module 218 may provide the TLS API module 210 with the CGI session ID (e.g., Session ID 120) of the incoming data (e.g., data 138), and obtain the TLS key (e.g., TLS key 136) of the secured communication channel that carried the incoming data to the web server 104. Upon obtaining the TLS key of the incoming data, the comparison module 218 may retrieve a pairing of CGI session ID and TLS key (e.g., pairing 124) that corresponds to the CGI session ID (e.g., Session ID 120). Subsequently, the comparison module 218 may compare the TLS key of the incoming data (e.g., TLS key 136) with the TLS key (e.g., TLS key 116) of the retrieved pair. If the two TLS keys match, the comparison module 218 may permit the incoming data to execute on the web server 104. Otherwise, the comparison module 218 may cause one or more secured communication channels that are associated with CGI session ID of the incoming data to terminate. In some embodiments, the comparison module 218 may be an integral part of the CGI Platform 208.

The data storage module 220 may be configured to store data in a portion of memory 314 (e.g., a database). In various embodiments, the data storage module 220 may be configured to store one or more pairs of CGI session IDs and TLS keys, such as the pairing 124.

Exemplary Process

Figure 3:
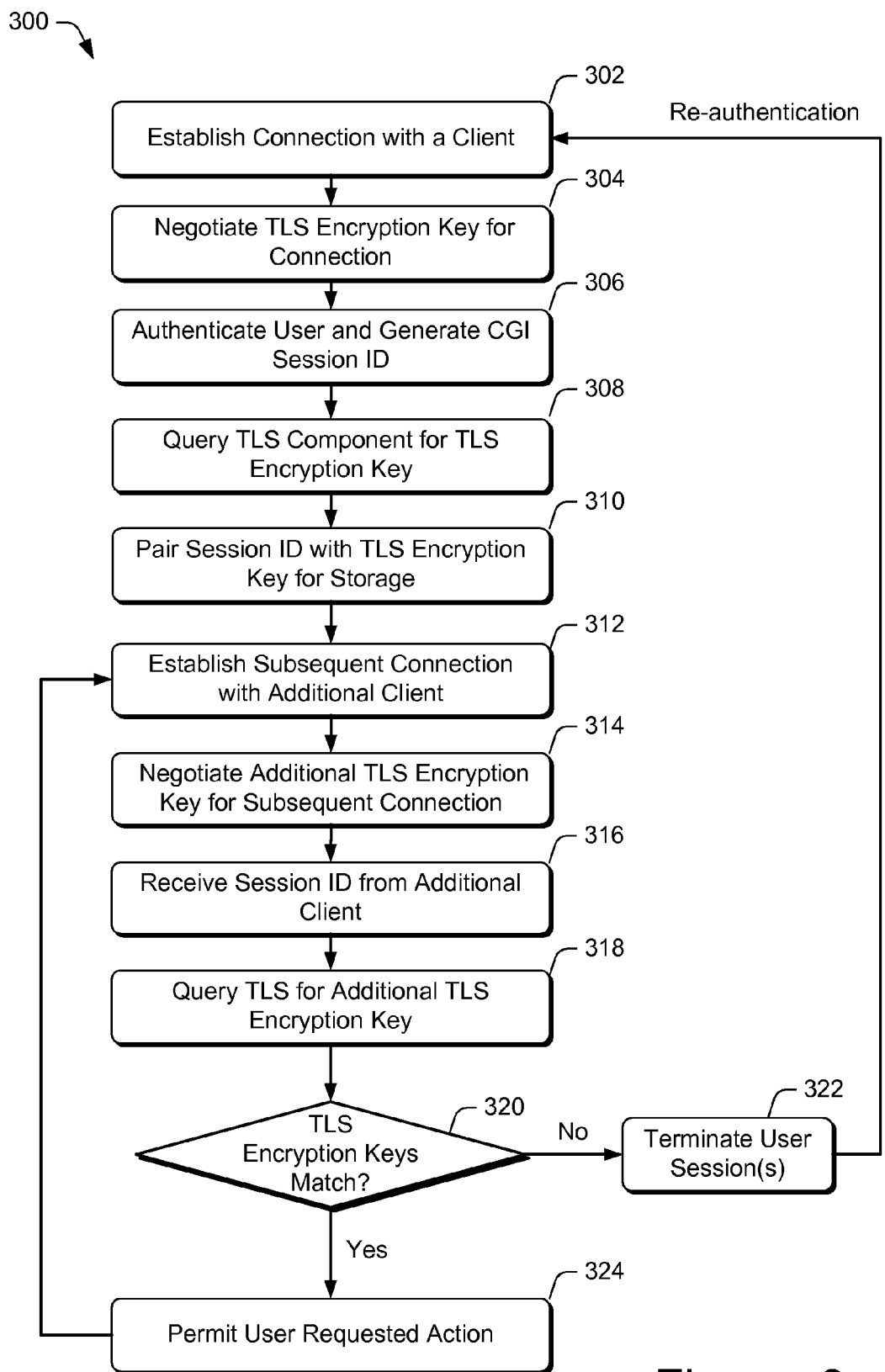
FIG. 3 shows a flow diagram illustrating an exemplary process for using the transport layer security (TLS) session and common gateway interface (CGI) ID pair as a user authentication mechanism on a web server, in accordance with various embodiments of TLS key and CGI session ID pairing.

FIG. 3 illustrates an exemplary process 300 for using the transport layer security (TLS) session and common gateway interface (CGI) ID pair as a user authentication mechanism on a web server, in accordance with various embodiments. The exemplary process 300 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types.

Furthermore, the order in which the operations are described is not intended to be construed as a limitation, and any number of the described blocks can be combined in any order and/or in parallel to implement the process. For discussion purposes, the process 300 is described with reference to the exemplary network environment 100 of FIGS. 1a and 1b, although they may be implemented in other system architectures.

At block 302, the web server 104 may establish a network connection with a client, such as the client 102. In various embodiments, the network connection may be established over one or more networks, the one or more networks may include at least one of a WAN component and a LAN component.

At block 304, the web server 104 and the client 102 may establish a secured communication channel by negotiating a common TLS encryption key. The TLS encryption key may be used to encrypt and decrypt the data exchanged between the client 102 and the server 104.

At block 306, the client 102 may enable a web user to authenticate to a CGI framework, such as CGI framework 118, to carry out an authenticated CGI session with a CGI session ID. The CGI session ID may be generated after the web user has correctly authenticated to the client 104 from the client 102.

At block 308, the CGI framework 118 of the web server 104 may query a TLS service component of the web server 104, such as TLS service component 116, for the TLS key that corresponds to the CGI session ID. In other words, the CGI framework 118 may obtain the TLS key of the secured communication channel over which data associated with the CGI session ID is carried.

At block 310, the web server 104 may pair the obtained TLS key with its corresponding CGI Session ID. The CGI framework 118 of the web server 104 may further store the pair of the TLS key and corresponding CGI session ID.

At block 312, the web server 104 may establish an additional network connection with another client, such as the client 126. In various embodiments, the additional network connection may be established over one or more networks, the one or more networks may include at least one of a WAN component and a LAN component.

At block 314, the web server 104 may establish a subsequent secured communication channel by negotiating another common TLS encryption key. The TLS encryption key may be used to encrypt and decrypt the data exchanged between the client 126 and the sever 104.

At block 316, the web server 104 may receive incoming data that is marked with a CGI session ID. In some instances, the incoming data may be from the client 102. However, in other instances, the incoming data may be malicious data that is marked with a hijacked CGI session ID.

At block 318, the CGI framework 118 of the web server 104 may again query a TLS service component of the web server 104, such as TLS service component 116, for the TLS key that corresponds to the CGI session ID of the incoming data. In other words, the CGI framework 118 may obtain the TLS key of the subsequent secured communication channel over which the incoming data associated with the CGI session ID is carried.

At decision block 320, the web server 104 may determine whether the obtained TLS key of the subsequent channel matches the TLS key that is supposed to be paired with the CGI session ID of the incoming data. If the web server 104 determines that the two TLS keys do not match ("no" at decision block 320), the process 300 may proceed to block 322. At block 322, the web server 104 may terminate one or more user sessions having the CGI session ID that corresponds to the obtained TLS key. In various embodiments, the web server 104 may only terminate the secured communication channel with the non-matching TLS key, as well as the CGI session carried by the secured communication with the non-matching TLS key. However, in other embodiments, the web server 104 may terminate all user sessions having the CGI session ID that corresponds to the obtained TLS key. Subsequently, the process 300 may loop back to block 302, where the web user may use a client to re-establish a connection with the web server 104.

However, if the web server 104 determines that the two TLS key do match ("yes" at decision block 320), the process 300 may proceed to block 324. At block 324, the incoming data, that is, which may include a user requested action, may be executed on the web server 104. Subsequently, the process 300 may return to block 312.

Exemplary Computing Device

FIG. 4 illustrates a representative computing device 400 that may be used to implement the pairing-based CGI session ID impersonation prevention techniques and mechanisms described herein. For example, the clients, gateways, and servers described herein may be implemented on the representative computing device 400. However, it is readily appreciated that the various embodiments of the pairing-based CGI session ID impersonation prevention techniques and mechanisms may be implemented in other computing devices, systems, and environments. The computing device 400 shown in FIG. 4 is only one example of a computing device and is not intended to suggest any limitation as to the scope of use or functionality of the computer and network architectures. Neither should the computing device 400 be interpreted as having any dependency or requirement relating to any one or combination of components illustrated in the example computing device.

In a very basic configuration, computing device 400 typically includes at least one processing unit 402 and system memory 404. Depending on the exact configuration and type of computing device, system memory 404 may be volatile (such as RAM), non-volatile (such as ROM, flash memory, etc.) or some combination of the two. System memory 404 typically includes an operating system 406, one or more program modules 408, and may include program data 410. The operating system 406 include a component-based framework 412 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 400 is of a very basic configuration demarcated by a dashed line 414. Again, a terminal may have fewer components but will interact with a computing device that may have such a basic configuration.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 416 and non-removable storage 418. Computer storage media may include volatile and nonvolatile, removable and non-removable media implemented in any method or technology for storage of information, such as computer readable instructions, data structures, program modules, or other data. System memory 404, removable storage 416 and non-removable storage 418 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 420 such as keyboard, mouse, pen, voice input device, touch input device, etc. Output device(s) 422 such as a display, speakers, printer, etc. may also be included. These devices are well known in the art and are not discussed at length here.

Computing device 400 may also contain communication connections 424 that allow the device to communicate with other computing devices 426, such as over a network. These networks may include wired networks as well as wireless networks. Communication connections 424 are one example of communication media. Communication media may typically be embodied by computer readable instructions, data structures, program modules, etc.

It is appreciated that the illustrated computing device 400 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The pairing of a transport layer security (TLS) session key and a common gateway interface (CGI) session ID may be used to prevent impersonation attacks based on hijacked CGI session IDs, where the hijacked CGI session IDS may be obtained by malicious attackers through cross-site scripting attacks, or other forms of attacks. The pairing of a TLS key and CGI session ID may be used as an authentication mechanism during access to a web server. The use of the TLS key and CGI session ID combination pair as an authentication mechanism may deprive a malicious attacker the ability to impersonate a legitimate user even if the attacker is able to hijack the legitimate user's CGI session ID. In this way, the legitimate user's data, as stored on the web server, may be further protected from unauthorized access.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

I claim:

1. A method for facilitating communication between a server and a first client, comprising:
    forming a first secured communication channel between the server and the first client using an initial transport layer security (TLS) key;

forming an authenticated common gateway interface (CGI) session over the first secured communication channel based on an initial CGI session identifier (ID);

combining the initial CGI session ID and the initial TLS key into a pair;

receiving incoming data that includes an incoming CGI session ID via the first secured communication channel or a second secured communication channel;

retrieving an incoming TLS key of the first or the second secured communication channel that carries the incoming CGI session ID; and permitting the incoming data to execute on the server when the incoming TLS key matches the initial TLS key of the pair.

2. The method of claim 1, further comprising terminating at least one of the first and second secured communication channels when the incoming TLS key does not match the initial TLS key of the pair.

3. The method of claim 1, further comprising terminating the authenticated CGI session when the incoming TLS key does not match the initial TLS key of the pair.

4. The method of claim 1, wherein the retrieving comprises:
  Identifying the first or the second communication channel that carries the incoming data and the incoming CGI session ID; and
  retrieving the incoming TLS key of the first or second communication channel.

5. The method of claim 1, wherein the retrieving comprises:
  providing the incoming CGI session ID to an application program interface (API) of a TLS server component; and
  retrieving the incoming TLS key of the first or the second communication channel from the TLS server component via the API,
  wherein the TLS server component is configured to form secured communication channels by negotiating TLS keys for use by the server and one or more clients.

6. The method of claim 1, wherein the receiving incoming data that includes an incoming CGI session ID via the second secured communication channel comprises:
  forming the second secured communication channel between the server and a second client using another TLS key; and
  receiving the incoming data that includes the incoming CGI session ID from the second client via the second secured communication channel.

7. The method of claim 1, wherein the receiving includes receiving incoming malicious data that includes the incoming CGI session ID.

8. A computer readable storage device storing computer-executable instructions that, when executed, cause one or more processors to perform acts comprising:
  forming a first secured communication channel between a server and a first client using an initial transport layer security (TLS) key;
  forming an authenticated common gateway interface (CGI) session over the first secured communication channel based on an initial CGI session identifier (ID);
  combining the initial CGI session ID and the initial TLS key into a pair at the server;
  receiving incoming data that includes an incoming CGI session ID via a second secured communication channel at the server;
  retrieving an incoming TLS key of the second secured communication channel that carries the incoming CGI session ID at the server; and
  terminating the authenticated CGI session when the incoming TLS key does not match the initial TLS key of the pair.

9. The computer readable storage device of claim 8, the computer-executable instructions causing the one or more processors to perform acts further comprising permitting the incoming data to execute on the server when the incoming TLS key matches the initial TLS key of the pair.

10. The computer readable medium of claim 8, the computer-executable instructions causing the one or more processors to perform acts further comprising terminating the first and second secured communication channels when the incoming TLS key does not match the initial TLS key of the pair.

11. The computer readable medium of claim 8, the wherein the retrieving comprises computer-executable instructions causing the one or more processors to perform acts further comprising:
  identifying the second communication channel that carries the incoming data and the incoming CGI session ID; and
  retrieving the incoming TLS key of the second communication channel.

12. The computer readable medium of claim 8, wherein the retrieving comprises computer-executable instructions causing the one or more processors to perform acts further comprising:
  providing the incoming CGI session ID to an application program interface (API) of a TLS server component; and
  retrieving the incoming TLS key of the second communication channel from the TLS server component via the API,
  wherein TLS server component is configured to form secured communication channels by negotiating TLS keys for use by the server and one or more clients.

13. The computer readable medium of claim 8, the wherein the receiving comprises computer-executable instructions causing the one or more processors to perform acts further comprising:
  forming the second secured communication channel between the server and a second client using another TLS key; and
  receiving the incoming data that includes the incoming CGI session ID from the second client via the second secured communication channel.

14. The computer readable medium of claim 8, wherein the receiving comprises computer-executable instructions causing the one or more processors to perform acts further comprising receiving incoming malicious data that includes the incoming CGI session ID.

15. A server, comprising:
  a transport layer security (TLS) server component to form a first secured communication channel between a server and a first client using an initial TLS key;
  a first common gateway interface (CGI) platform component to form an authenticated CGI session over the first secured communication channel based on an initial CGI session identifier (ID);
  a pairing component to combine the initial CGI session ID and the initial TLS key into a pair at the server;
  a second CGI platform component to receive incoming data that includes an incoming CGI session ID via a second secured communication channel at the server;
  a retrieval component to retrieve an incoming TLS key of the second secured communication channel that carries the incoming CGI session ID at the server; and a comparison component to terminate at least one of the first and second secured communication channels when the incoming TLS key does not match the initial TLS key of the pair.

16. The server of claim 15, wherein the comparison component is to terminate the authenticated CGI session when the incoming TLS key does not match the initial TLS key of the pair.

17. The server of claim 15, wherein the comparison component is to permit the incoming data to execute on the server when the incoming TLS key matches the initial TLS key of the pair.

18. The server of claim 15, wherein the retrieval component is to retrieve an incoming TLS key of the second secured communication channel by:
    identifying the second communication channel that carries the incoming data and the incoming CGI session ID; and
    retrieving the incoming TLS key of the second communication channel.

19. The server of claim 15, further comprising an application program interface (API) to:
    receiving the incoming CGI session ID of the incoming data from the retrieval component; and
    providing the incoming TLS key of the second communication channel that carries the incoming CGI session ID to the retrieval component.

20. The server of claim 15, wherein the TLS server component is to further form the second secured communication channel between the server and a second client using another TLS key, wherein the second CGI platform is to further receive the incoming data that includes the incoming CGI session ID from the second client via the second secured communication channel.

* * * * *